(12) United States Patent
Jamieson et al.

(10) Patent No.: US 11,270,297 B2
(45) Date of Patent: Mar. 8, 2022

(54) PAYMENT HANDLING APPARATUS AND METHOD

(71) Applicant: COMCARDE LIMITED, Inverness Highland (GB)

(72) Inventors: Stuart Jamieson, Inverness Highland (GB); Keith Symington, Inverness Highland (GB); Tom Matthews, Inverness Highland (GB)

(73) Assignee: COMCARDE LIMITED, Inverness Highland (GB)

( * ) Notice: Subject to any disclaimer, the term of this patent is extended or adjusted under 35 U.S.C. 154(b) by 230 days.

(21) Appl. No.: 16/074,033

(22) PCT Filed: Jan. 31, 2017

(86) PCT No.: PCT/GB2017/050241
§ 371 (c)(1),
(2) Date: Jul. 30, 2018

(87) PCT Pub. No.: WO2017/134425
PCT Pub. Date: Aug. 10, 2017

(65) Prior Publication Data
US 2019/0043046 A1    Feb. 7, 2019

(30) Foreign Application Priority Data

Feb. 1, 2016  (GB) ..................... 1601796

(51) Int. Cl.
*G06Q 20/38* (2012.01)
*G06Q 20/32* (2012.01)
(Continued)

(52) U.S. Cl.
CPC ....... *G06Q 20/3821* (2013.01); *G06Q 20/327* (2013.01); *G06Q 20/382* (2013.01);
(Continued)

(58) Field of Classification Search
CPC ............. G06Q 20/3821; G06Q 20/327; G06Q 20/382; G06Q 20/40; G06Q 20/42
See application file for complete search history.

(56) References Cited

U.S. PATENT DOCUMENTS 6,327,578 B1 * 12/2001 Linehan ................ G06Q 20/02
705/65
7,069,249 B2    6/2006 Stolfo et al.
(Continued)

FOREIGN PATENT DOCUMENTS

CA      2879290        1/2014
WO    2015103963       7/2015
(Continued)

OTHER PUBLICATIONS

International Search Report of Counterpart PCT International Application No. PCT/GB2017/050241.

*Primary Examiner* — Patrick McAtee
*Assistant Examiner* — Terry Nathan Murray
(74) *Attorney, Agent, or Firm* — Liu & Liu

(57) ABSTRACT

The present invention relates to payment handling apparatus (10) which is operable to effect payment from a purchaser to a vendor. The payment handling apparatus (10) comprises a purchaser's device running a purchaser program (12) which is operable by the purchaser and a vendor's device running a vendor program (16) which is operable by the vendor. The purchaser's device (12) and the vendor's device (16) are in data communication with each other by way of a communication channel (26). The purchaser program is configured to encrypt a payment message and to convey a payment request to the vendor program by way of the communication channel (26). The payment request comprises the encrypted payment message. The payment handling apparatus is configured to encrypt a confirmation message and to convey a confirmation code to the purchaser program in dependence
(Continued)

on receipt of the payment request by the vendor program. The confirmation code comprises the encrypted confirmation message.

13 Claims, 3 Drawing Sheets

(51) Int. Cl.
G06Q 20/42 (2012.01)
G06Q 20/40 (2012.01)

(52) U.S. Cl.
CPC ........... *G06Q 20/385* (2013.01); *G06Q 20/40* (2013.01); *G06Q 20/4014* (2013.01); *G06Q 20/42* (2013.01)

(56) References Cited

U.S. PATENT DOCUMENTS

| | | | |
|---|---|---|---|
| 7,917,434 B2 | 3/2011 | Kugeman et al. | |
| 8,015,110 B2 | 9/2011 | Sims et al. | |
| 8,108,266 B2 | 1/2012 | Drudis et al. | |
| 8,601,588 B1* | 12/2013 | Black | G06F 11/008 |
| | | | 726/25 |
| 8,949,607 B2* | 2/2015 | Boesgaard Soerensen | |
| | | | G06Q 20/04 |
| | | | 705/30 |
| 9,940,653 B1 | 4/2018 | Rygaard et al. | |
| 9,990,613 B1 | 6/2018 | Bhatt et al. | |
| 2002/0174075 A1 | 11/2002 | Mirlas et al. | |
| 2003/0110136 A1* | 6/2003 | Wells | G06Q 40/12 |
| | | | 705/64 |
| 2003/0126094 A1* | 7/2003 | Fisher | G06Q 20/26 |
| | | | 705/75 |
| 2003/0212629 A1* | 11/2003 | King | G07F 7/08 |
| | | | 705/39 |
| 2005/0010535 A1 | 1/2005 | Camenisch | |
| 2007/0143227 A1* | 6/2007 | Kranzley | G06Q 20/3827 |
| | | | 705/67 |
| 2009/0177563 A1* | 7/2009 | Bernstein | G06Q 20/04 |
| | | | 705/30 |
| 2009/0240623 A1 | 9/2009 | McCarthy et al. | |
| 2009/0276347 A1 | 11/2009 | Kargman | |
| 2011/0153498 A1 | 6/2011 | Makhotin et al. | |
| 2011/0276418 A1 | 11/2011 | Velani | |
| 2012/0011009 A1 | 1/2012 | Lindsey et al. | |
| 2013/0179352 A1 | 7/2013 | Dwyre et al. | |
| 2014/0025958 A1 | 1/2014 | Caiman | |
| 2014/0222533 A1* | 8/2014 | Ovick | G06Q 30/0283 |
| | | | 705/14.23 |
| 2014/0229375 A1 | 8/2014 | Zaytzsev et al. | |
| 2014/0279504 A1 | 9/2014 | Cook et al. | |
| 2014/0316873 A1* | 10/2014 | Sines | G06Q 20/26 |
| | | | 705/75 |
| 2014/0372223 A1 | 12/2014 | Wolfe et al. | |
| 2015/0066778 A1* | 3/2015 | Jang | G06Q 30/0283 |
| | | | 705/14.23 |
| 2015/0161713 A1* | 6/2015 | Kim | G06Q 20/20 |
| | | | 705/7.25 |
| 2015/0332234 A1* | 11/2015 | Choi | G06Q 40/12 |
| | | | 705/64 |
| 2015/0339668 A1 | 11/2015 | Wilson et al. | |
| 2016/0055441 A1* | 2/2016 | Rappoport | G06Q 20/20 |
| | | | 705/7.25 |
| 2017/0053357 A1* | 2/2017 | Bowman | G06Q 20/3827 |
| | | | 705/67 |
| 2017/0109802 A1 | 4/2017 | Kothari et al. | |
| 2017/0221067 A1 | 8/2017 | Barquero Garro et al. | |
| 2017/0270518 A1* | 9/2017 | Kylanpaa | G06Q 20/02 |
| | | | 705/65 |
| 2018/0232715 A1 | 8/2018 | Continanza et al. | |

FOREIGN PATENT DOCUMENTS

| | | |
|---|---|---|
| WO | 2016020672 | 2/2016 |
| WO | 2016085408 | 6/2016 |

* cited by examiner

PAYMENT HANDLING APPARATUS AND METHOD

FIELD OF THE INVENTION

The present invention relates to a payment handling apparatus which is operable to effect payment from a purchaser to a vendor. The present invention also relates to a payment handling method which effects payment from a purchaser to a vendor.

BACKGROUND ART

Arrangements for making payments by way of a mobile device are known. According to one longer used approach, the vendor has apparatus comprising a handheld device such as a smartphone and a credit/debit card reader. The handheld device and the credit/debit card reader are in data communication and normally wireless data communication with each other such as by way of Bluetooth. Payment for goods or services is accomplished by the vendor entering the transaction details including the cost of the goods or services into the apparatus before the purchaser's credit/debit card is read by the credit/debit card reader and the purchaser authorises payment by entering a PIN associated with the credit/debit card.

More recently approaches to making payments without operative use of a credit/debit card have been introduced. One such approach involves the purchaser entering credit/debit card data into the vendor's mobile device or into a client process running on the purchaser's mobile device which is controlled over the Internet by a vendor process. This approach relies on underlying card payment infrastructure. A further known approach involves the purchaser logging into his banking application before the vendor passes a code containing payment details including the vendor's banking details to the purchaser. The purchaser then enters the code into the banking application which is then operative by way of data communication with the vendor's bank server to effect payment to the vendor such as by way of a faster Automated Clearing House (ACH) payment.

The present inventors have appreciated the above described known approaches to have vulnerabilities when at least one of the purchaser's mobile device and the vendor's mobile device is not in communication with the respective bank server. The purchaser's mobile device or the vendor's mobile device may not, for example, be in communication with a bank server on account of a fault in the communication channel. By way of another example, the purchase may be taking place where there is no communication with a bank server for either of the purchaser's mobile device and the vendor's mobile device such as in an aircraft when the aircraft is in flight.

The present invention has been devised in light of this appreciation. It is therefore an object for the present invention to provide improved payment handling apparatus which is operable to effect payment from a purchaser to a vendor. It is a further object for the present invention to provide an improved payment handling method which effects payment from a purchaser to a vendor.

STATEMENT OF INVENTION

According to a first aspect of the present invention there is provided payment handling apparatus which is operable to effect payment from a purchaser to a vendor, the payment handling apparatus comprising:
 a purchaser's device running a purchaser program which is operable by the purchaser; and
 a vendor's device running a vendor program which is operable by the vendor, the purchaser's device and the vendor's device being in data communication with each other by way of a communication channel,
 the purchaser program being configured to encrypt a payment message and to convey a payment request to the vendor program by way of the communication channel, the payment request comprising the encrypted payment message,
 the payment handling apparatus being configured to encrypt a confirmation message and to convey a confirmation code to the purchaser program in dependence on receipt of the payment request by the vendor program, the confirmation code comprising the encrypted confirmation message.

Payment handling apparatus according to the present invention is operable to effect payment from a purchaser to a vendor. The payment handling apparatus comprises a purchaser's device, such as a smartphone, running a purchaser program which is operable by the purchaser. The payment handling apparatus further comprises a vendor's device, such as point of sale computing apparatus, running a vendor program which is operable by the vendor. The purchaser's device and the vendor's device are in data communication with each other by way of a communication channel, such as in accordance with the Bluetooth protocol or by way of Near Field Communication protocols. The purchaser program is configured to encrypt a payment message and to convey a payment request to the vendor program by way of the communication channel. The payment request comprises the encrypted payment message. The payment handling apparatus is configured to encrypt a confirmation message and to convey a confirmation code to the purchaser program in dependence on receipt of the payment request by the vendor program. The confirmation code comprises the encrypted confirmation message. The payment request and the confirmation code provide for subsequent processing of the payment whereby lack of communication between the purchaser's device and the purchaser's bank server, between the vendor's device and the vendor's bank server or between each of the purchaser's device and the vendor's device and its respective bank sever may be no impediment to the purchaser approving payment for goods or services and the vendor agreeing to such despite completion of the payment process occurring at a later time.

Encryption may comprise key based encryption. Encryption may comprise asymmetric encryption. Encryption may comprise public and private key encryption. The purchaser program may be configured to generate a one-time password (OTP) by way of a Time-based One-time Password (TOTP) algorithm and to encrypt the payment message with the OTP. Alternatively or in addition, the payment handling apparatus may be configured to generate an OTP by way of a TOTP and to encrypt the confirmation message with the OTP.

The purchaser program may be configured to run the TOTP algorithm. The TOTP algorithm may be operative to combine a key with a timestamp to form the OTP. The timestamp may be generated by the purchaser's device. The key may be pre-shared between the purchaser program and the purchaser's bank server.

The purchaser program may be configured to run an encryption algorithm. The encryption algorithm may be operative to encrypt the payment message with the OTP.

Encryption may be in accordance with the Advanced Encryption Standard (AES). Alternatively the encryption algorithm may be operative with a public key in accordance with PGP encryption.

In respect of the confirmation message, the payment handling apparatus may be configured to run an encryption algorithm, such as the TOTP algorithm. More specifically and as described further below either the purchaser's bank server or the vendor's device may be operative to run an encryption algorithm, such as the TOTP algorithm depending on circumstances which determine whether the purchaser's bank server or the vendor's device forms the confirmation code. Furthermore the payment handling apparatus may be configured to run the encryption algorithm. Further features of the TOTP algorithm and the encryption algorithm run by the payment handling apparatus are as described above with reference to the purchaser program.

The purchaser program may be configured to form the payment message. The payment message may comprise at least one of: device identification data, which identifies the purchaser's device; an amount to be paid by the purchaser; bank account identification data, which identifies the purchaser's bank account; and a tip for the vendor. The device identification data for the purchaser's device may comprise at least one of: MAC; NEI; mobile telephone number for the device; email address for the device; and a device token, i.e. a unique identifier for the purchaser's device.

A payment code may be formed before the payment request is conveyed to the vendor program. Where there is communication between the purchaser's device and the purchaser's bank server, the purchaser's bank server may be configured to form the payment code. Otherwise, the purchaser program may be configured to form the payment code. In this latter case the payment code may comprise off-line payment data which reflects there being no communication between the purchaser's device and the purchaser's bank server. The off-line payment data comprising payment code may be formed in dependence on at least one failed attempt to effect payment involving communication with the purchaser's bank server. The steps of generating a one-time password, encryption of the payment message and conveying a payment request to the vendor may be taken in dependence on formation of the payment code. The payment code may further comprise at least one of: routing information for the purchaser's bank account, for example, the sort code; and random data. The random data may be pre-shared between the purchaser program and the purchaser's bank server. The random data may be operative to make the payment code unique. The payment code may be unencrypted, such as by way of the OTP, whereby the bank account routing information may be visible to components of the payment handling apparatus and thereby provide for proper routing of data.

The payment code may be conveyed to the vendor program. According to one approach the payment code may be passed by the purchaser to the vendor, such as verbally or by way of a QR code, and the vendor may enter or scan the payment code into the vendor device. According to another approach the purchaser program may be configured to convey the payment code to the vendor program by way of a communication channel, such as by pushing a message by way of a Near Field Communication (NFC) link.

Following receipt of the payment code, a secure communication channel may be formed between the purchaser's device and the vendor's device. The secure communication channel may be wireless. More specifically the secure communication channel may be in accordance with the Bluetooth protocol or by way of Near Field Communication protocols. Formation of the secure communication channel may be initiated by the vendor program and more specifically following receipt of the payment code. Where there are plural vendor's devices, such as a row of point of sale apparatus, the payment code may be operative to provide for matching between the appropriate vendor's device and the purchaser's device. Where the payment code comprises random data, the random data may be operative to make the payment code unique whereby there is matching between the appropriate vendor's device and the purchaser's device.

As is described further below, the encrypted payment message may be decrypted by the purchaser's bank server. However, the encrypted payment message may not be decrypted by the vendor program or by the vendor's bank server. Application of OTP decryption by the purchaser's bank server requires a time of generation of the OTP by the purchaser program.

According to a first approach, the vendor program is operative to determine a time of receipt of the payment request from the purchaser program, for example by way of a timestamp generated by the vendor's device. The time of generation of the OTP may be taken as being the time of receipt of the payment request. Operation according to the first approach may depend on sufficiently prompt conveying of payment request from purchaser program to vendor program such that the time difference between the time of generation of the OTP and time of receipt of the payment request is less than the OTP time window, such as less than a time window of plus or minus 30 seconds. The vendor program may be further operative to append the time of receipt of the payment request to the payment request before its onward transmission. It is to be noted that the time of receipt of the payment request is not encrypted by way of the OTP.

According to a second approach, the payment request may comprise the encrypted payment message and a time of generation of the OTP. It is to be noted that the time of generation of the OTP is not encrypted by way of the OTP.

As mentioned above, one other or both of the purchaser's device and the vendor's device may suffer a loss of communication with its respective bank server. Where there is a loss of communication between one of the purchaser's device and the purchaser's bank server and the vendor's device and the vendor's bank server, the payment may be completed for the most part by making use of remaining communication channels as will be described in more detail immediately below. Where there is a loss of communication between both of the purchaser's device and the purchaser's bank server and the vendor's device and the vendor's bank server, payment may be processed to an extent sufficient to provide a level of comfort for both purchaser and vendor as will be described subsequently below.

Where one of the vendor's device and the purchaser's device is in communication with its respective bank server but there is no communication between the other of the vendor's device and the purchaser's device and its respective bank server, the vendor program may be configured to convey a transaction code to the vendor's bank server. Where the vendor's device is in communication with the vendor's bank server, the transaction code may be conveyed directly from the vendor's device to the vendor's bank server. The payment handling apparatus may therefore comprise the vendor's bank server. Where the purchaser's device is in communication with the purchaser's bank server, the transaction code may be conveyed indirectly from the vendor's device to the vendor's bank server by way of the purchaser's device and the purchaser's bank server. The payment handling apparatus may therefore further comprise the purchaser's bank server.

The transaction code may be formed by the vendor program. The transaction code may comprise the payment request. The transaction code may further comprise the payment code. Where the transaction code is conveyed by way of the purchaser's device and the purchaser's bank server, the transaction code may further comprise vendor bank server routing information, such as the vendor's sort code. The payment code may provide for identification of the purchaser's bank.

The vendor program may be configured to encrypt the transaction code. The transaction code may be encrypted with an OTP. The OTP may be formed as described above in respect of encryption of the payment message. Either the first approach described above, i.e. time of receipt, or the second approach described above, i.e. time of generation, may be employed in respect of OTP encryption of the transaction code. Where the transaction code comprises vendor bank server routing information the vendor bank server routing information may not be encrypted. Upon receipt of the transaction code, the vendor's bank server may be configured to decrypt the encrypted transaction code. The transaction code may thus be passed securely by way of the purchaser's device and the purchaser's bank server when there is no communication between the vendor's device and the vendor's bank server.

The vendor's bank server may be operative to initiate payment between the vendor's bank server and the purchaser's bank server. The vendor's bank server may, therefore, be configured to convey a vendor's bank transaction code to the purchaser's bank server. The vendor's bank transaction code may comprise the transaction code. The payment handling apparatus may therefore comprise the purchaser's bank server. The purchaser's bank server may be configured to identify the purchaser's bank account in dependence on the routing information, for example, the sort code. The purchaser's bank server may be configured to confirm the identity of the purchaser in dependence on the decrypted device identification data.

The purchaser program may have been operative with the purchaser's bank server before the step of conveying the payment request to the vendor program to share with the purchaser's bank server the key used by the TOTP algorithm to form the one-time password. In addition the purchaser program and the purchaser's bank server may be operative to share plural different keys. The purchaser program and the purchaser's bank server may be operative to select one of the plural different keys in dependence on a predetermined criterion. For example the keys may be selected in turn irrespective of time lapse or keys may be selected in turn in dependence on time lapse, such as selection of a different key on each day. The purchaser's bank server may be configured to run the TOTP algorithm. The purchaser's bank server may be operative to run the TOTP algorithm using the previously shared key and the time of generation of the one-time password which is comprised in the transaction code to form an OTP. As described above, the time of generation of the one-time password is unencrypted and therefore the purchaser's bank server may be able to use the time of generation of the one-time password. The purchaser's bank server may be further operative to use the OTP to decrypt the encrypted part of the transaction code. The purchaser's bank server may thus be able to extract data comprised in the transaction code. Thereafter the purchaser's bank server may be operative to confirm the identity of the purchaser in dependence on the decrypted data. More specifically, the purchaser's bank server may be operative to determine whether or not the purchaser has sufficient funds to cover the intended purchase. Thereafter the purchaser's bank server may be operative to approve the transaction.

Similarly the vendor program may have been operative with the vendor's bank server before the step of conveying the transaction code to the vendor's bank server to share with the vendor's bank server the key used by the TOTP algorithm to form the one-time password used in respect of the transaction code. Features described in the immediately preceding paragraph may apply in respect of encryption of the transaction code.

Following approval of the transaction, the purchaser's bank server may be operative to form and convey an authentication code to the vendor's bank server. The authentication code may comprise a transaction identifier. The authentication code may provide notification to the vendor's bank server that payment is in hand.

Alternatively or in addition and following approval of the transaction, the purchaser's bank server may be operative to form the confirmation code. Alternatively or in addition the purchaser's bank server may be operative to store data relating to the payment and pending data, which indicates the payment as pending. The confirmation code may comprise the transaction identifier. The confirmation code may further comprise an encrypted confirmation message. The purchaser's bank server may therefore be configured to run an encryption algorithm such as AES. The purchaser's bank server may be operative to encrypt the confirmation message. The confirmation message may be encrypted on the basis of an OTP. The purchaser's bank server may therefore be configured to run a TOTP algorithm. The purchaser's bank server may be operative to form the OTP in dependence on a confirmation key and the time of generation of the OTP. The confirmation code may further comprise the time of generation of the OTP. The confirmation key may consist of information known to the purchaser program, such as the amount to be paid. The confirmation message may comprise the amount being paid. The confirmation message may further comprise further data to increase the data length of the confirmation message and thereby make malicious decryption more difficult. The further data may be random. Alternatively or in addition the further data may be rotating. Such further data may be pre-shared between the purchaser's bank server and the purchaser program.

Thereafter and where one of the vendor's device and the purchaser's device is in communication with its respective bank server but there is no communication between the other of the vendor's device and the purchaser's device and its respective bank server, the purchaser's bank server may be configured to convey the confirmation code to the purchaser's device. Where the purchaser's device is in communication with the purchaser's bank server, the confirmation code may be conveyed directly from the purchaser's bank server to the purchaser's device. Where the vendor's device is in communication with the vendor's bank server, the confirmation code may be conveyed indirectly from the purchaser's bank server to the purchaser's device by way of the vendor's bank server and the vendor's device. Where the confirmation code is conveyed indirectly, the confirmation code may be conveyed with routing information whereby the purchaser's bank server may identify the vendor's bank server. The routing information may comprise a sort code for the vendor. Furthermore the vendor's bank server may be operative to encrypt the confirmation code, such as by way of an OTP. The vendor program may be configured to decrypt the vendor's bank server encrypted confirmation code, such as by running the TOTP algorithm. The confirmation code may thus be passed securely by way of the vendor's device and the vendor's bank server when there is no communication between the purchaser's device and the purchaser's bank server.

The purchaser program may be operative to run the TOTP algorithm to decrypt the encrypted confirmation message. As described above in respect of decryption of the payment message, the purchaser program may be operative to decrypt the encrypted confirmation message in dependence on the time of generation of the OTP comprised in the confirmation code or in dependence on the time of receipt of the confirmation code, such as time of receipt of the confirmation code by the purchaser's device. The purchaser program may thus be able to confirm that the vendor has been in communication with the purchaser's bank despite the lack of communication between the vendor's device and the vendor's bank server. Correspondingly and where there is a lack of communication between the purchaser's device and the purchaser's bank server the purchaser program may be able to confirm that the vendor has been in communication with the purchaser's bank.

When communication between the purchaser's device and the purchaser's bank server is re-established, the purchaser program may be operative to convey a purchaser confirmation code to the purchaser's bank server. The purchaser confirmation code may comprise the confirmation code. The purchaser confirmation code may be encrypted and more specifically may be OTP encrypted. The purchaser's bank server may be operative to decrypt the received purchaser confirmation code.

When communication between the vendor's device and the vendor's bank server is re-established, the vendor program may be operative to convey a vendor confirmation code to the vendor's bank server. The vendor confirmation code may comprise the confirmation code. The vendor confirmation code may be encrypted and more specifically may be OTP encrypted. The vendor's bank server may be operative to decrypt the received vendor confirmation code.

When payment is made, a bank confirmation message, which is encrypted but not by way of an OTP, may be sent between the purchaser's bank server and the vendor's bank server.

When neither the vendor's device nor the purchaser's device is in communication with its respective bank server, the vendor program may be operative to form the confirmation code and more specifically a vendor confirmation code. The vendor confirmation code may be formed in dependence on receipt of the payment request by the vendor's device. The vendor program may be configured to convey the vendor confirmation code to the purchaser's device. The vendor program may be configured to generate an OTP by way of a TOTP, to encrypt a confirmation message with the OTP and to form the confirmation code such that the confirmation code comprises the encrypted confirmation message.

The confirmation code formed by the vendor program when neither the vendor's device nor the purchaser's device is in communication with its respective bank server may differ from the confirmation code formed by the purchaser's bank server when one of the vendor's device and the purchaser's device is in communication with its respective bank server. More specifically the confirmation message comprised in the confirmation code formed by the vendor program may comprise the payment code. More specifically the confirmation message may further comprise at least one of: an amount to be paid; vendor's identification data; and random data. The vendor's identification data may comprise at least one of: identification data for the vendor, such as purchaser's boarding card data or seat number where the transaction takes place on a plane; a hardware identification code for at least one of the vendor's device and the purchaser's device, such as a MAC or IMEI; identification data for at least one of the vendor's device and the purchaser's device such as mobile telephone number or email address; key data such as may be formed by the vendor; and a message token, i.e. a unique identifier. The random data may be of a form as described above. Although payment processing is only partial, the confirmation message may, depending on circumstances, provide a sufficient level of confidence to the vendor that payment will be made in due course by the purchaser.

When communication between each of the vendor's device and the purchaser's device and its respective bank server is re-established, payment processing may proceed. Payment processing may be as described above and subsequently in accordance with known practice. Further to such known practice, the encrypted messages and more specifically OTP encrypted messages may be passed for decryption as described above.

Alternatively or in addition, communication, such as between the purchaser device and the purchaser's bank server, may be electronic communication.

Alternatively or in addition, communication between the purchaser device and the vendor device may be wireless. According to one approach communication may be in accordance with the Bluetooth protocol. According to another approach, communication may comprise near field communication. The purchaser device may therefore comprise near field communication transceiver apparatus. The vendor device may comprise near field communication transceiver apparatus. The near field communication transceiver apparatus may provide for radio frequency communication of data between the purchaser device and the vendor device.

The payment handling apparatus may comprise plural purchaser devices. In a typical application the payment handling apparatus may comprise many purchaser devices at any one time. Payment may be effected in respect of each of the plural purchaser devices at the same time and in particular with respect to the step of conveying the payment request. At different times payment may be effected in respect of different purchaser bank servers and different vendor bank servers. The identity of a purchaser bank server or a vendor bank server may depend on the identity of the payment handling establishment engaged by the purchaser or vendor. For example one purchaser may engage a first bank and another purchaser may engage a second bank. Indeed the payment handling apparatus may be configured such that each of plural purchasers or vendors engages a different payment handling establishment at any one time. By way of further example the payment handling establishment may be a clearing bank, a credit/debit card handling establishment, an acquiring bank, etc. At least one of the purchaser bank server and the vendor bank server may comprise the payment handling establishment. The payment handling establishment may, for example, be a credit card handling establishment such that payment is made on behalf of the purchaser with actual settlement of the sum being paid by the purchaser at a later time. The payment handling apparatus may comprise at least one of plural purchaser bank servers and plural vendor bank servers. Where the payment handling apparatus comprises bank server apparatus the devices and the bank server apparatus may be at locations spaced apart from each other. Where the payment handling apparatus comprises purchaser bank server apparatus and vendor bank server apparatus, the purchaser bank server apparatus and the vendor bank server apparatus may be at locations spaced apart from each other.

At least one of the purchaser's device and the vendor's device may be operable on client apparatus. The payment handling apparatus may comprise at least one such client apparatus. A client may be operable on at least one of a Personal Computer, such as a laptop, and a mobile computing device, such as a tablet computer or a smartphone. At least one of the purchaser's bank server and the vendor's bank server may be operable on server apparatus. The payment handling apparatus may comprise at least one such server apparatus.

The purchaser and the vendor may engage the same payment handling establishment, for example the same bank. The purchaser's bank server and the vendor's bank server may therefore be comprised in the same server apparatus. Server apparatus may be distributed such that a purchaser related process is operative on a first part of the server apparatus and a vendor related process is operative on a second part of the server apparatus. Indeed a purchaser or server related process may be operative on different parts of server apparatus at different times. Alternatively or in addition, first and second parts of a purchaser or server related process may be operative on different parts of server apparatus during the course of effecting payment of one sum from the purchaser's bank account to the vendor's bank account.

A server, for example the purchaser's bank server or the vendor's bank server, may comprise a server application. Where communication is by way of the Internet the server application may comprise a web server. A client, for example the purchaser program or the vendor program, may be configured to run a client application. Where communication is by way of the Internet the client application may comprise a web client. The purchaser program may be operative to provide the functions and operations described above. Communication between a device and a server may be by way of at least one of: a computer network, such as the Internet; and a metropolitan or wide area network, such as the Global System for Mobile Communications (GSM) network or 4G. Communication between the purchaser bank server and the vendor bank server may be by way of a communications link, for example a dedicated communications link or a computer network, such as the Internet. A program, for example the purchaser program or the vendor program, may be configured to provide a dialog box. The dialog box may be a web browser window. The dialog box may be displayed on a display surface of a device, such as a display screen of a mobile computing device. The dialog box may provide for reciprocal communication between a device and a user. The dialog box may comprise at least one user operable component, such as a clickable or touch sensitive area, which is operative to provide for entry of data and control by a user.

According to a second aspect of the present invention there is provided a payment handling method which effects payment from a purchaser to a vendor, the method comprising:
  encrypting a payment message by way of a purchaser program running on a purchaser's device comprised in payment handling apparatus;
  conveying a payment request by way of a communication channel between the purchaser's device and a vendor's device comprised in the payment handling apparatus from the purchaser program to a vendor program running on the vendor's device, the payment request comprising the encrypted payment message;
  encrypting a confirmation message by way of a program running on the payment handling apparatus;
  conveying a confirmation code to the purchaser program in dependence on receipt of the payment request by the vendor program, the confirmation code comprising the encrypted confirmation message.

Embodiments of the second aspect of the present invention may comprise one or more features of the first aspect of the present invention.

According to a third aspect of the present invention there is provided a computer program comprising program instructions for causing computer apparatus to perform the method according to the second aspect of the present invention. More specifically, the computer program may be at least one of: embodied on a record medium; embodied in read only memory; stored in a computer memory; and carried on an electrical carrier signal. Further embodiments of the third aspect of the present invention may comprise one or more features of the first aspect of the present invention.

According to a fourth aspect of the present invention there is provided a computer system comprising program instructions for causing computer apparatus to perform the method according to the second aspect of the present invention. More specifically the program instructions may be at least one of: embodied on a record medium; embodied in a read only memory; stored in a computer memory; and carried on an electrical carrier signal. Further embodiments of the fourth aspect of the present invention may comprise one or more features of the first aspect of the present invention.

According to a further aspect of the present invention there is provided payment handling apparatus which is operable to effect payment from a purchaser to a vendor, the payment handling apparatus comprising: a purchaser's device running a purchaser program which is operable by the purchaser; and a vendor's device running a vendor program which is operable by the vendor, the purchaser's device and the vendor's device being in data communication with each other by way of a communication channel, the purchaser program being configured to convey a payment request to the vendor program by way of the communication channel.

Embodiments of the further aspect of the present invention may comprise one or more features of the first aspect of the present invention.

According to another aspect of the present invention there is provided event verification apparatus which is operable to verify an event in which a first party and a second party are involved, the event verification apparatus comprising:
  a first party's device running a first party program which is operable by the first party; and
  a second party's device running a second party program which is operable by the second party, the first party's device and the second party's device being in data communication with each other by way of a communication channel,
  the first party program being configured to encrypt an event related message and to convey a event verification request to the second party program by way of the communication channel, the event verification request comprising the encrypted event related message,
  the event verification apparatus being configured to encrypt a confirmation message and to convey a confirmation code to the first party program in dependence on receipt of the event verification request by the second party program, the confirmation code comprising the encrypted confirmation message.

Embodiments of the present aspect of the present invention may comprise one or more features of any previous aspect of the present invention.

According to another aspect of the present invention there is provided transaction handling apparatus which is operable to effect a transaction between first and second parties, the transaction handling apparatus comprising:

a first party's device running a first party program which is operable by the first party; and a second party's device running a second party program which is operable by the second party, the first party's device and the second party's device being in data communication with each other by way of a communication channel, the first party program being configured to generate a one-time password (OTP) by way of a Time-based One-time Password (TOTP) algorithm, encrypt a transaction message with the OTP and to convey a transaction request to the second party program by way of the communication channel, the transaction request comprising the encrypted transaction message and a time of generation of the one-time password.

Embodiments of the present aspect of the present invention may comprise one or more features of any previous aspect of the present invention.

BRIEF DESCRIPTION OF DRAWINGS

Further features and advantages of the present invention will become apparent from the following specific description, which is given by way of example only and with reference to the accompanying drawings, in which.

DESCRIPTION OF EMBODIMENTS

Figure 1:
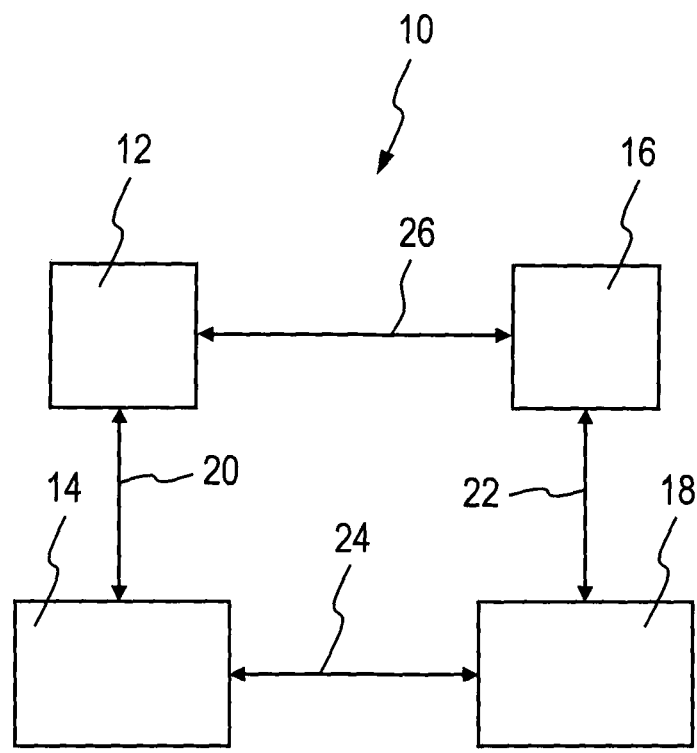
FIG. 1 is a block diagram representation of payment handling apparatus according to the present invention.

A block diagram representation of payment handling apparatus 10 according to the present invention is shown in FIG. 1. The payment handling apparatus 10 comprises a purchaser client 12, a purchaser's bank server 14, a vendor client 16 and a vendor's bank server 18. The purchaser client 12 is a process operative on mobile computing apparatus owned by a purchaser, such as a tablet computer or more typically a smartphone. The vendor client 16 is a process operative on computing apparatus owned by a vendor, such as a laptop computer, a tablet computer or a PC based till. The purchaser's bank server 14 is comprised in purchaser server apparatus operated by a payment processing authority such as a bank. Typically the purchaser server apparatus has a distributed architecture. Likewise the vendor's bank server 18 is comprised in vendor server apparatus operated by a payment processing authority such as a bank. Again the vendor server apparatus typically has a distributed architecture. Communication of data between the purchaser client 12 and the purchaser's bank server 14 is by way of a computer network 20, such as the Internet or a metropolitan or wide area network 20, such as the Global System for Mobile Communications (GSM) or 4G network. Likewise communication of data between the vendor client 16 and the vendor's bank server 18 is by way of a computer network 22, such as the Internet, or a metropolitan or wide area network 22, such as the Global System for Mobile Communications (GSM) or 4G network. Communication between the purchaser's bank server 14 and the vendor's bank server 18 is by way of a communications link 24, for example a dedicated communications link or a computer network, such as the Internet. Under certain circumstances a dedicated communications link is preferred on account of the greater level of security afforded in comparison to a more open Internet based communications link. Communication of data between the purchaser client 12 and the vendor client 16 is by way of a wireless communication link 26 such as in accordance with the Bluetooth standard or by way of a near field communication link.

Figure 2A:
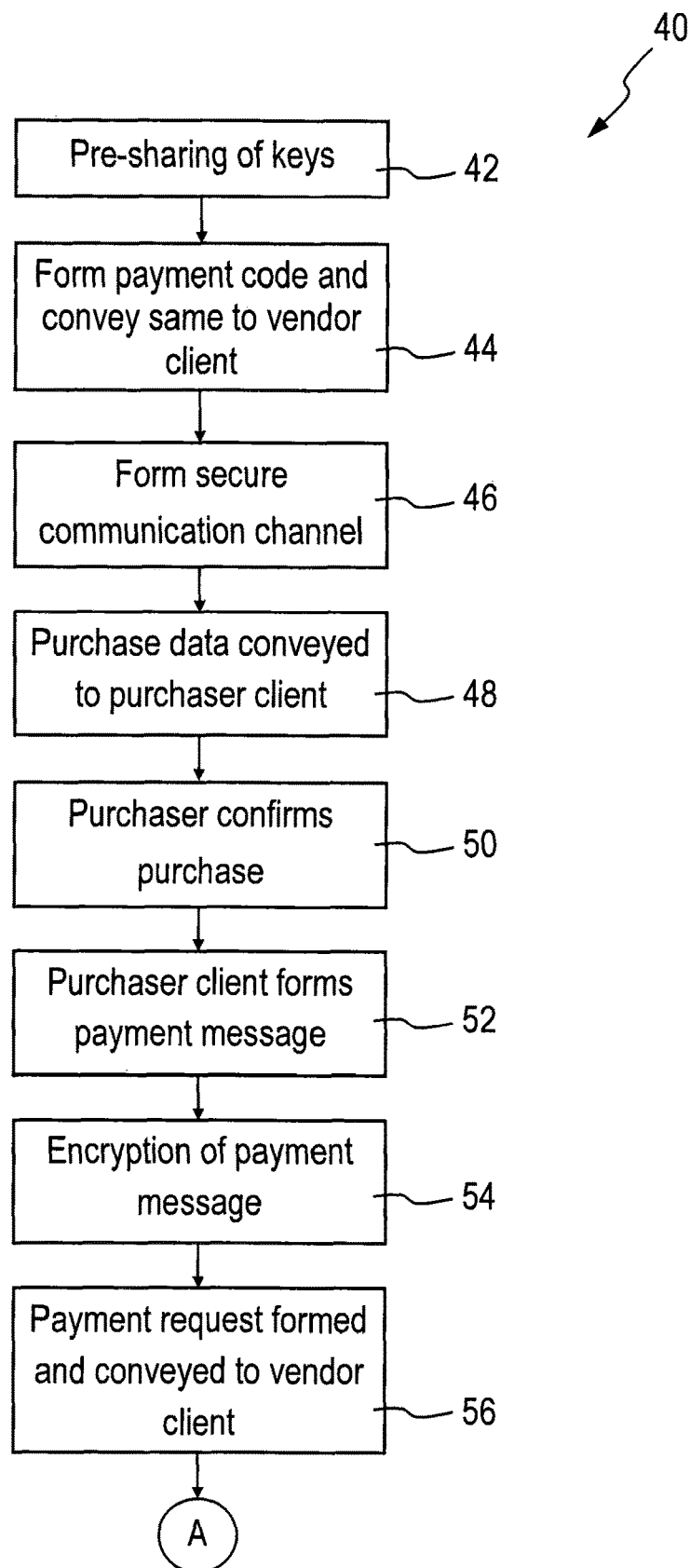
FIGS. 2A and 2B represent the main stages of operation of the payment handling apparatus of FIG. 1 when there is lack of communication between the purchaser's device and the purchaser's bank server.
Figure 2B:
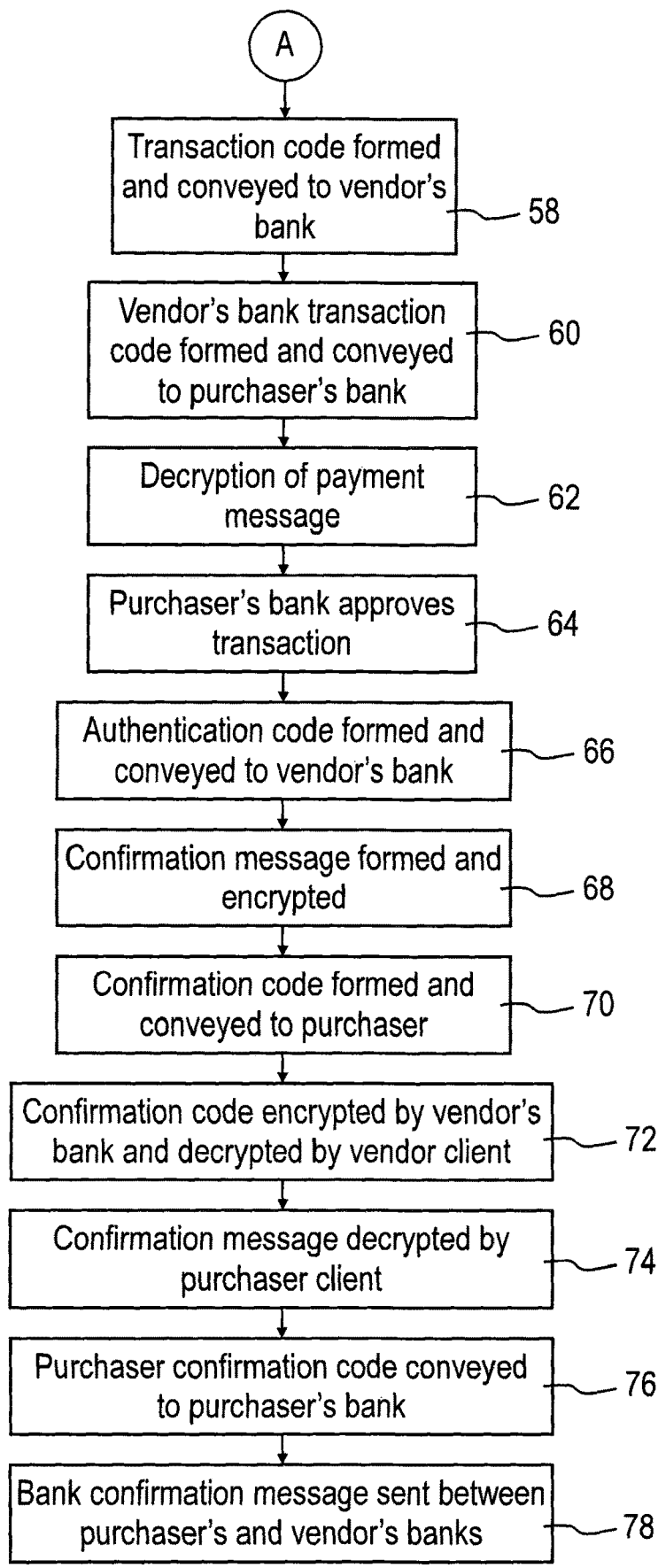

Operation of the payment handling apparatus 10 of FIG. 1 in accordance with the present invention will now be described with reference to FIGS. 2A and 2B which are flow chart representations of steps of operation of the payment handling apparatus 10 according to three different circumstances when there is a lack of communication between at least one client 12, 16 and its respective server 14, 18. Lack of communication may be on account of a fault in a communication channel or where payment is being made in an aircraft when the aircraft is in flight.

The first circumstance arises when there is lack of communication between the purchaser's device and the purchaser's bank server. The main stages of operation of the payment handling apparatus of FIG. 1 under this first circumstance are represented in flow chart form 40 in FIGS. 2A and 2B. When communication between the purchaser's device and the purchaser's bank server is secure before the lack of communication, there is a preliminary step of sharing with the purchaser's bank server 14 plural different keys used by a TOTP algorithm to form a one-time password (OTP) 42. Formation of an OTP is described further below. The purchaser client 12 and the purchaser's bank server 14 are operative to select one of the plural different keys in dependence on a predetermined criterion. For example the keys are selected in turn irrespective of time lapse or keys are selected in turn in dependence on time lapse, such as selection of a different key on each day.

At a later time a purchaser decides upon a purchase, such as an item in a retail outlet. The purchaser begins the purchase by operating his smartphone which is running a dedicated purchaser client application 12 (which constitutes a purchaser program). The client application is operative to display a dialog box on a display screen of the smartphone. The dialog box is configured to provide for reciprocal communication between the purchaser client application 12 and the purchaser. In accordance with normal design practice for smartphone applications, the dialog box comprises touch sensitive areas which are operable by the purchaser to provide for entry of data and control of the purchaser client application 12 by the purchaser. The purchaser initiates communication with a server of at least one payment processing authority 14 by way of the dialog box. However the purchaser client application 12 is unable to communicate with the purchaser's bank server 14 because of a failure in the communication channel between the purchaser's smartphone and the purchaser's bank server 14. The purchaser client application 12 tries a predetermined number of times, such as three times, to establish communication between the purchaser's smartphone and the purchaser's bank server 14.

Upon failure to establish communication after the predetermined number of attempts, the purchaser client application 12 is operative to form a payment code comprising off-line payment data which reflects there being no communication between the purchaser's smartphone and the purchaser's bank server 14. The payment code further comprises the purchase price, the sort code for the purchaser's bank and random data. The random data has been pre-shared between the purchaser client application and the purchaser's bank server as described above. When the payment code has been formed, the purchaser client application 12 is operative to convey the payment code to the vendor client 16 by pushing a message by way of a Near Field Communication (NFC) link between them with the off-line payment data being operative to inform the vendor client 16 of the lack of communication between the purchaser's device and the purchaser's bank server 44. In this approach the payment code comprises the random data mentioned above. According to another approach the purchaser passes the relevant data to the vendor verbally or by way of a QR code. The purchaser informs the vendor that there is no communication between his or her smartphone and his or her bank server. The vendor enters appropriate data into his or her device. The purchaser then enters the sort code for his or her bank into the vendor's device.

Following receipt of the payment code or entry of data by the purchaser into the vendor's device, the vendor client 16 is operative to initiate formation of a secure wireless communication channel between the purchaser's smartphone and the vendor's device 46. The secure wireless communication channel is in accordance with the Bluetooth protocol or by way of Near Field Communication protocols. Where there are plural vendor's devices, such as a row of point of sale apparatus, the payment code is operative to provide for matching between the appropriate vendor's device and the purchaser's smartphone. The random data comprised in the payment code makes the payment code unique whereby matching between the appropriate vendor's device and the purchaser's device is achieved.

Following formation of a secure wireless communication channel between the purchaser's smartphone and the vendor's device, the vendor conveys to the purchaser data relating to the purchase by way of the communication channel. Data relating to the purchase comprises the like of identification of goods or services being purchased, the purchase price and data identifying the vendor 48. The purchaser then confirms by operation of his or her device that the purchaser wishes to proceed with the purchase 50. Following confirmation the purchaser client application 12 is operative to form a payment message 52. The payment message comprises: identification data which identifies the purchaser's smartphone; an amount to be paid by the purchaser; bank account identification data, which identifies the purchaser's bank account; and a tip for the vendor. The device identification data for the purchaser's device comprises at least one of: mobile telephone number for the smartphone; email address for the smartphone; and a device token, i.e. a unique identifier for the purchaser's smartphone. Then the purchaser client application 12 is operative to generate a one-time password (OTP) by way of a Time-based One-time Password (TOTP) algorithm and to encrypt the payment message with the OTP by way of an encryption algorithm 56. The TOTP algorithm is operative to combine a key with a timestamp to form the OTP. The timestamp is generated by the purchaser's smartphone. The key is pre-shared between the purchaser client application and the purchaser's bank server as described above. Encryption is in accordance with the Advanced Encryption Standard (AES). Alternatively the encryption algorithm is operative on the basis of a public key in accordance with PGP encryption. It is to be noted that PGP encryption and decryption are an alternative to OTP encryption and decryption as described elsewhere herein. The purchaser client application 12 is then operative to form a payment request comprising the encrypted payment message and to convey the payment request to the vendor client 16 by way of the secure communication channel 56.

According to a first approach, the vendor client 16 is operative to determine a time of receipt of the payment request from the purchaser client, for example by way of a timestamp generated by the vendor's device. The time of generation of the OTP is taken as being the time of receipt of the payment request depending on sufficiently prompt conveying of payment request from purchaser client to vendor client such that the time difference between the time of generation of the OTP and time of receipt of the payment request is within an OTP time window of less than plus or minus 30 seconds. The vendor client 16 is further operative to append the time of receipt of the payment request to the payment request before its onward transmission. It is to be noted that the time of receipt of the payment request is not encrypted by way of the OTP. According to a second approach, the payment request comprises the encrypted payment message and a time of generation of the OTP. It is to be noted that the time of generation of the one-time password is not encrypted by way of the OTP.

Following receipt of the payment request, the vendor client 16 is operative to form a transaction code. The transaction code comprises the payment request and the payment code. The payment code provides for identification of the purchaser's bank server 16. Thereafter the vendor client 16 is operative to convey the transaction code directly to the vendor's bank server 18, 58. Upon receipt of the transaction code, the vendor's bank server 18 is configured to convey a vendor's bank transaction code to the purchaser's bank server 14, 60. The vendor's bank transaction code comprises the transaction code. The purchaser's bank server 14 is configured to run the TOTP algorithm using one of the previously shared keys and the time of generation of the one-time password or the time of receipt of the payment request which is comprised in the transaction code to form an OTP. As described above, the time of generation of the one-time password or time of receipt of the payment request is unencrypted and therefore the purchaser's bank server 14 is able to use the time of generation of the one-time password or time of receipt of the payment request. The purchaser's bank server 14 is further operative to use the OTP to decrypt the encrypted part of the transaction code 62. The purchaser's bank server 14 is thus able to extract data comprised in the transaction code. Thereafter the purchaser's bank server is operative to confirm the identity of the purchaser in dependence on the decrypted device identification data. More specifically, the purchaser's bank server 14 is operative to determine whether or not the purchaser has sufficient funds to cover the intended purchase. Thereafter the purchaser's bank server 14 is operative to approve the transaction 64.

Following approval of the transaction, the purchaser's bank server 14 is operative to form an authentication code and to convey the authentication code to the vendor's bank server 18, 66. The authentication code comprises a transaction identifier. The authentication code provides notification to the vendor's bank server that payment is in hand.

Following approval of the transaction, the purchaser's bank server 14 is operative to form a confirmation message which comprises the amount being paid and further data such as pre-shared random data. The purchaser's bank server is configured to run a TOTP algorithm to thereby form an OTP in dependence on a confirmation key and the time of generation of the OTP. The confirmation key consists of information known to the purchaser client 12, such as the amount to be paid. The purchaser's bank server 14 is further configured to run an encryption algorithm such as AES whereby the confirmation message is encrypted on the basis of the OTP 68. Thereafter the purchaser's bank server 14 is operative to form a confirmation code comprising the transaction identifier, the encrypted confirmation message and the time of generation of the OTP. The purchaser's bank server 14 is also operative to store data relating to the payment and pending data, which indicates the payment as pending.

Thereafter the confirmation code is conveyed indirectly from the purchaser's bank server 14 to the purchaser's smartphone 12 by way of the vendor's bank server 18 and the vendor's device 16, 70. The confirmation code is conveyed with routing information whereby the purchaser's bank server identifies the vendor's bank server. The routing information comprises a sort code for the vendor. The vendor's bank server is operative to OTP encrypt the received confirmation code 72. The vendor program is configured to OTP decrypt the vendor's bank server encrypted confirmation code 72. The confirmation code is thus passed securely by way of the vendor's bank server and the vendor's device. The purchaser client application 12 is operative to run the TOTP algorithm to decrypt the encrypted confirmation message. As described above in respect of decryption of the payment message, the purchaser client application 12 is operative to decrypt the encrypted confirmation message in dependence on the time of generation of the OTP comprised in the confirmation code or in dependence on the time of receipt of the confirmation code, such as time of receipt of the confirmation code by the purchaser's device 74. The purchaser client application 12 is thus able to confirm that the vendor has been in communication purchaser's bank.

When communication between the purchaser's smartphone 12 and the purchaser's bank server 14 is re-established, the purchaser client application 12 is operative to convey a purchaser confirmation code to the purchaser's bank server 14, 76. The purchaser confirmation code comprises the confirmation code. The purchaser confirmation code is OTP encrypted. The purchaser's bank server 14 is operative to decrypt the received purchaser confirmation code. It is to be noted that a vendor confirmation code has already been conveyed from the vendor client 16 to the vendor's bank server 18 in view of there having been no lack of communication between the vendor's device and the vendor's bank server. The vendor confirmation code comprises the confirmation code which is OTP encrypted. The vendor's bank server is operative to decrypt the received vendor confirmation code.

When payment is made a bank confirmation message is sent between the purchaser's bank server and the vendor's bank server 78. The bank confirmation message is encrypted but not by way of an OTP. The bank confirmation message is of known form and function and will be familiar to the reader skilled in the art.

The second circumstance arises when there is lack of communication between the vendor's device 16 and the vendor's bank server 18. The main stages of operation of the payment handling apparatus of FIG. 1 under this second circumstance will now be described. Steps of the process in the second circumstance are common to steps of the process in the first circumstance. The reader's attention is directed above to the description provided above in respect of FIGS. 2A and 2B for such common steps. Steps particular to the second circumstance will now be described.

In view of there being communication between the purchaser's device 12 and the purchaser's bank server 14, the purchaser client is able to communicate with the purchaser's bank server at the time of purchase. Therefore the payment code is formed by the purchaser's bank server and is conveyed to the purchaser client before being conveyed, as described above, to the vendor client. Operation is then as described above with reference to FIGS. 2A and 2B up to the formation of the transaction code by the vendor client 16. Instead of being conveyed directly to the vendor's bank server 18, the transaction code is conveyed by way of the purchaser client and the purchaser's bank server to the vendor's bank server. Before being conveyed indirectly the transaction code is OTP encrypted by the vendor client 16 and routing information such as the vendor's sort code is appended to the encrypted transaction code. Upon the receipt, the transaction code is decrypted by the vendor's bank server 18. Encryption, decryption and pre-sharing of keys are as described above.

Thereafter operation is as described above with reference to FIGS. 2A and 2B up to the formation of the confirmation code by the purchaser's bank server 14. Instead of the confirmation code being conveyed by way of the vendor's bank server 18 and the vendor client 16, the confirmation code is conveyed directly to the purchaser client 12. Thereafter operation is as described above with reference to FIGS. 2A and 2B in respect of decryption of the confirmation message. Handling of the vendor confirmation code and the purchaser confirmation code differs as will now be described. When communication between the vendor's device 16 and the vendor's bank server 18 is re-established, the vendor program is operative to convey a vendor confirmation code to the vendor's bank server. The vendor confirmation code comprises the confirmation code and is OTP encrypted. Upon receipt of the vendor confirmation code, the vendor's bank server is operative to decrypt the vendor confirmation code. It is to be noted that a purchaser confirmation code has already been conveyed from the purchaser client 12 to the purchaser's bank server 14 in view of there having been no lack of communication between the purchaser's device and the purchaser's bank server. Completion of the process in respect of the sending of the bank confirmation message is as described above.

The third circumstance arises when there is lack of communication between the purchaser's device 12 and the purchaser's bank server 14 and between the vendor's device 16 and the vendor's bank server 18. The main stages of operation of the payment handling apparatus of FIG. 1 under this third circumstance will now be described. Steps of the process in the third circumstance are common to steps of the process in the first circumstance. The reader's attention is directed above to the description provided above in respect of FIGS. 2A and 2B for such common steps. Steps particular to the third circumstance will now be described.

Instead of the confirmation code being formed by the purchaser's bank server 14, the vendor client 16 is operative to form a vendor confirmation code following receipt of the payment request. The vendor confirmation code comprises a confirmation message which is OTP encrypted by the vendor client. The vendor client is configured to generate an OTP by way of a TOTP, to encrypt a confirmation message with the OTP and to form the vendor confirmation code such that the confirmation code comprises the encrypted confirmation message. The vendor confirmation code formed by the vendor client when neither the vendor's device nor the purchaser's device is in communication with its respective bank server differs from the confirmation code formed by the purchaser's bank server when one of the vendor's device and the purchaser's device is in communication with its respective bank server. The confirmation message comprised in the vendor confirmation code comprises the payment code, an amount to be paid, vendor's identification data and random data. The vendor's identification data comprises at least one of: identification data for the vendor, such as purchaser's boarding card data or seat number where the transaction takes place on a plane; a hardware identification code for at least one of the vendor's device and the purchaser's device, such as a MAC or IMEI; identification data for at least one of the vendor's device and the purchaser's device such as mobile telephone number or email address; key data such as is formed by the vendor; and a message token, i.e. a unique identifier. The random data is of a form as described above. The vendor client 16 then conveys the vendor confirmation code to the purchaser client 12.

When communication between each of the vendor's device and the purchaser's device and its respective bank server is re-established, payment processing proceeds as described above but without communication between the vendor's device and the purchaser's device. Typically the vendor's device and the purchaser's device are no longer within communication range with each other when communication between each of the vendor's device and the purchaser's device and its respective bank server is re-established. For example, payment processing is as described above in respect of formation of the transaction code, the vendor's bank transaction code and decryption of the payment message by the purchaser's bank server 14 upon receipt of the vendor's bank transaction code. Payment processing is further as described above in respect of formation of the confirmation code by the purchaser's bank server and conveying of the same directly to the purchaser client 12 for decryption of the confirmation message by the purchaser client 12. This confirmation code is not the same as the above described vendor confirmation code formed by the vendor client 16. The purchaser client 12 is operative to compare the content of the confirmation code and the vendor confirmation code for the purpose of payment validation. The purchaser client 12 is further operative to convey the vendor confirmation code to the purchaser's bank server 14, which is then operative to compare the content of the confirmation code and the vendor confirmation code for the purpose of payment validation. Payment processing is yet further as described above in respect of the purchaser confirmation code being conveyed to the purchaser's bank server and the sending of the bank confirmation message between the purchaser's and vendor's bank servers.

The invention claimed is:

1. Payment handling apparatus which is operable to effect payment from a purchaser to a vendor, the payment handling apparatus comprising:
   a purchaser's mobile computing device running a purchaser program which is operable by the purchaser;
   a vendor's point of sale computing apparatus running a vendor program which is operable by the vendor, the purchaser's mobile computing device and the vendor's point of sale computing apparatus in data communication with each other by way of a communication channel;
   a purchaser's bank server in data communication with the purchaser's mobile computing device by way of a first computer network or a first mobile communication network; and
   a vendor's bank server in data communication with the vendor's point of sale computing apparatus by way of a second computer network or a second mobile communication network, the vendor's bank server in data communication with the purchaser's bank server by way of a communications link, the payment handling apparatus operable to effect payment from the purchaser to the vendor despite: interruption of communication between the purchaser's bank server and the purchaser's mobile computing device; or interruption of communication between the vendor's bank server and the vendor's point of sale computing apparatus,
   wherein the purchaser program: generates a first one-time password (OTP) by way of a first Time-based One-time Password (TOTP) algorithm, the first TOTP algorithm combining a payment key with a payment timestamp to form the first OTP, the payment timestamp generated by the purchaser's mobile computing device at a time of generation of the first OTP and the payment key having been pre-shared between the purchaser program and the purchaser's bank server before the interruption of communication; encrypts a payment message with the first OTP; and conveys a payment request to the vendor program by way of the communication channel, the payment request comprising the encrypted payment message,
   wherein, and when there is interruption of communication between the purchaser's bank server and the purchaser's mobile computing device, the payment request is received by the vendor's bank server from the vendor program by way of the second computer network or the second mobile communication network, and the payment request is then received by the purchaser's bank server from the vendor's bank server by way of the communications link,
   or when there is interruption of communication between the vendor's bank server and the vendor's point of sale computing apparatus, the payment request is received by the purchaser program from the vendor program by way of the communication channel, and the payment request is then received by the purchaser's bank server from the purchaser program by way of the first computer network or the first mobile communication network,
   wherein the encrypted payment message comprised in the payment request is decrypted by a second Time-based One-time Password (TOTP) algorithm running on the purchaser's bank server, the encrypted payment message not having been decrypted by the vendor program or by the vendor's bank server,
   wherein the purchaser's bank server in dependence on decryption of the encrypted payment message by the purchaser's bank server: generates a second one-time password (OTP) by way of the second TOTP algorithm, the second TOTP algorithm combining a confirmation key with a confirmation timestamp to form the second OTP, the confirmation timestamp generated by the purchaser's bank server at the time of generation of the second OTP and the confirmation key comprising information comprised in the now decrypted payment message; encrypts a confirmation message with the second OTP; and forms a confirmation code, the confirmation code comprising the encrypted confirmation message, wherein, and when there is interruption of communication between the purchaser's bank server and the purchaser's mobile computing device, the purchaser's bank server conveys the confirmation code to the vendor's bank server by way of the communications link, the vendor's bank server conveys the received confirmation code to the vendor program by way of the second computer network or the second mobile communication network, and the vendor program conveys the received confirmation code to the purchaser program by way of the communication channel, or when there is interruption of communication between the vendor's bank server and the vendor's point of sale computing apparatus, the purchaser's bank server conveys the confirmation code to the purchaser program by way of the first computer network or the first mobile communication network, wherein the purchaser program runs the first TOTP algorithm to decrypt the encrypted confirmation message comprised in the received confirmation code, the encrypted confirmation message decrypted in dependence on: the confirmation timestamp being comprised in the confirmation code; or a time of receipt of the confirmation code by the purchaser program, the information comprised in the encrypted payment message being already known to the purchaser program, and wherein decryption by the purchaser's bank server of the encrypted payment message comprises:

the payment request further comprises the time of generation of the first OTP, the encrypted payment message being decrypted by the purchaser's bank server in dependence on the pre-shared payment key and the time of generation of the first OTP comprised in the payment request; or the vendor program determines a time of receipt of the payment request from the purchaser program and appends the determined time of receipt to the payment request before onward transmission of the payment request, the encrypted payment message being decrypted by the purchaser's bank server in dependence on the pre-shared payment key and the time of receipt of the payment request appended to the payment request.

2. Payment handling apparatus according to claim 1, in which the purchaser program forms the payment message, the payment message comprising at least one of: device identification data, which identifies the purchaser's mobile computing device; an amount to be paid by the purchaser; bank account identification data, which identifies the purchaser's bank account; and a tip for the vendor.

3. Payment handling apparatus according to claim 2, in which the device identification data for the purchaser's mobile computing device comprises at least one of: a MAC; an IMEI; a mobile telephone number for the purchaser's mobile computing device; an email address for the purchaser's mobile computing device; and a unique identifier for the purchaser's mobile computing device.

4. Payment handling apparatus according to claim 1, in which a payment code is formed before the payment request is conveyed to the vendor program, the payment code formed by: the purchaser's bank server where there is no interruption of communication between the purchaser's mobile computing device and the purchaser's bank server; or the purchaser program where there is interruption of communication between the purchaser's mobile computing device and the purchaser's bank server, the payment code comprising off-line payment data which reflects there being interruption of communication between the purchaser's mobile computing device and the purchaser's bank server.

5. Payment handling apparatus according to claim 4, in which the payment code further comprises at least one of: routing information for the purchaser's bank account; and random data, the random data having been pre-shared between the purchaser program and the purchaser's bank server, and the payment code is unencrypted.

6. Payment handling apparatus according to claim 4, in which the payment code is conveyed to the vendor program, and a secure communication channel is formed between the purchaser's mobile computing device and the vendor's point of sale computing apparatus following receipt of the payment code.

7. Payment handling apparatus according to claim 4, wherein the vendor program conveys a transaction code to the vendor's bank server: directly from the vendor's point of sale computing apparatus to the vendor's bank server by way of the second computer network or the second mobile communication network where there is interruption of communication between the purchaser's mobile computing device and the purchaser's bank server; or indirectly from the vendor's point of sale computing apparatus to the vendor's bank server by way of the purchaser's mobile computing device and the purchaser's bank server where there is interruption of communication between the vendor's point of sale computing apparatus and the vendor's bank server.

8. Payment handling apparatus according to claim 7 in which the transaction code is formed by the vendor program, the transaction code comprising the payment request and the payment code.

9. Payment handling apparatus according to claim 8 when the transaction code is conveyed indirectly from the vendor's point of sale computing apparatus to the vendor's bank server by way of the purchaser's mobile computing device and the purchaser's bank server, in which the transaction code further comprises vendor bank server routing information.

10. Payment handling apparatus according to claim 7 in which the vendor program encrypts the transaction code.

11. Payment handling apparatus according to claim 7 in which the vendor's bank server initiates payment between the vendor's bank server and the purchaser's bank server, and the vendor's bank server conveys a vendor's bank transaction code to the purchaser's bank server, the vendor's bank transaction code comprising the transaction code.

12. Payment handling apparatus according to claim 1, in which the payment message comprises at least one of: device identification data, which identifies the purchaser's mobile computing device; an amount to be paid by the purchaser; and bank account identification data, which identifies the purchaser's bank account, and the confirmation key comprises at least one of: the device identification data; the amount to be paid by the purchaser; and the bank account identification data.

13. A payment handling method which effects payment from a purchaser to a vendor in payment handling apparatus comprising a purchaser's mobile computing device running a purchaser program which is operable by the purchaser, a vendor's point of sale computing apparatus running a vendor program which is operable by the vendor, a purchaser's bank server in data communication with the purchaser's mobile computing device by way of a first computer network or a first mobile communication network, and a vendor's bank server in data communication with the vendor's point of sale computing apparatus by way of a second computer network or a second mobile communication network, the purchaser's mobile computing device and the vendor's point of sale computing apparatus in data communication with each other by way of a communication channel, and the vendor's bank server in data communication with the purchaser's bank server by way of a communications link, the method comprising:

the purchaser program generating a first one-time password (OTP) by way of a first Time-based One-Time Password (TOTP) algorithm, the first TOTP algorithm combining a payment key with a timestamp to form the first OTP, the timestamp generated by the purchaser's mobile computing device at a time of generation of the OTP and the payment key having been pre-shared between the purchaser program and the purchaser's bank server before: interruption of communication between the purchaser's bank server and the purchaser's mobile computing device; or interruption of communication between the vendor's bank server and the vendor's point of sale computing apparatus;

the purchaser program encrypting the payment message with the one-time password (OTP);

the purchaser program conveying a payment request to the vendor program by way of the communication channel, the payment request comprising the encrypted payment message;

if there is interruption of communication between the purchaser's bank server and the purchaser's mobile computing device, receiving the payment request in the vendor's bank server from the vendor program by way of the second computer network or the second mobile communication network, and then receiving the payment request in the purchaser's bank server from the vendor's bank server by way of the communications link;

if there is interruption of communication between the vendor's bank server and the vendor's point of sale computing apparatus, receiving the payment request by the purchaser program from the vendor program by way of the communication channel, and then receiving the payment request in the purchaser's bank server from the purchaser program by way of the first computer network or the first mobile communication network;

decrypting the encrypted payment message comprised in the received payment request by way of a second Time-based One-Time Password (TOTP) algorithm running on the purchaser's bank server, the encrypted payment message is not decrypted by the vendor program or by the vendor's bank server;

generating a second one-time password (OTP) by way of the second TOTP algorithm;

encrypting a confirmation message with the second OTP in the purchaser's bank server, the second TOTP algorithm combining a confirmation key with a confirmation timestamp to form the second OTP, the confirmation timestamp generated by the purchaser's bank server at the time of generation of the second OTP and the confirmation key comprising information comprised in the now decrypted payment message;

forming in the purchaser's bank server a confirmation code comprising the encrypted confirmation message;

if there is interruption of communication between the purchaser's bank server and the purchaser's mobile computing device, conveying the confirmation code to the vendor's bank server by way of the communications link, the vendor's bank server conveying the received confirmation code to the vendor program by way of the second computer network or the second mobile communication network, and the vendor program conveying the received confirmation code to the purchaser program by way of the communication channel;

if there is interruption of communication between the vendor's bank server and the vendor's point of sale computing apparatus, conveying the confirmation code from the purchaser's bank server to the purchaser program by way of the first computer network or the first mobile communication network; and decrypting the encrypted confirmation message comprised in the received confirmation code by way of the first TOTP algorithm, the encrypted confirmation message decrypted in dependence on: the confirmation timestamp being comprised in the confirmation code; or a time of receipt of the confirmation code by the purchaser program, the information comprised in the encrypted payment message being already known to the purchaser program, wherein decryption in the purchaser's bank server of the encrypted payment message comprises:

the payment request further comprises the time of generation of the first OTP, the encrypted payment message is decrypted by the purchaser's bank server in dependence on the pre-shared payment key and the time of generation of the first OTP comprised in the payment request; or the vendor program determines a time of receipt of the payment request from the purchaser program and appends the determined time of receipt to the payment request before onward transmission of the payment request, the encrypted payment message is decrypted by the purchaser's bank server in dependence on the pre-shared payment key and the time of receipt of the payment request appended to the payment request.

* * * * *